(12) United States Patent
Larsson et al.

(10) Patent No.: US 8,864,991 B2
(45) Date of Patent: Oct. 21, 2014

(54) MODULE FOR ASSEMBLY OF A DISC FILTER

(75) Inventors: Per Larsson, Trelleborg (SE); Emil Svensson, Trelleborg (SE); Kjell-Åke Svensson, Limhamn (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 385 days.

(21) Appl. No.: 13/318,909

(22) PCT Filed: May 5, 2010

(86) PCT No.: PCT/SE2010/050498
§ 371 (c)(1),
(2), (4) Date: Jan. 4, 2012

(87) PCT Pub. No.: WO2010/128944
PCT Pub. Date: Nov. 11, 2010

(65) Prior Publication Data
US 2012/0103890 A1    May 3, 2012

(30) Foreign Application Priority Data

May 6, 2009    (SE) ...................................... 0950317

(51) Int. Cl.
*B01D 33/23*    (2006.01)
(52) U.S. Cl.
CPC ..................................... *B01D 33/23* (2013.01)
USPC .......................................... 210/331; 210/486

(58) Field of Classification Search
CPC ......................................................... B01D 33/23
USPC .................................................. 210/331, 486
See application file for complete search history.

(56) References Cited

U.S. PATENT DOCUMENTS 3,917,534 A * 11/1975 Moore ........................... 210/486
4,203,846 A * 5/1980 Barthelemy .................... 210/486
5,925,248 A * 7/1999 Moore et al. ................... 210/331

FOREIGN PATENT DOCUMENTS

GB              2297701 A  *  8/1996
WO    WO 2004076026         9/2004

* cited by examiner

*Primary Examiner* — Thomas M Lithgow
(74) *Attorney, Agent, or Firm* — Coats and Bennett PLLC

(57) ABSTRACT

The present invention refers to a module (2) for assembly of a filter frame (1) for at least one filter disc (not shown) of a rotatable disc filter, which filter frame is provided for supporting at least two filter segments (not shown), which filter segments together form the outer part of said filter disc. The module (2) comprises an intermediate member (5) intended to beat least partially provided between two adjacent filter segments. According to the invention, the intermediate member (5) comprises at least two parts (6, 7) which are interconnectable with each other in the radial direction of the disc filter

20 Claims, 4 Drawing Sheets

MODULE FOR ASSEMBLY OF A DISC FILTER

This application is a U.S. National Stage Application of PCT Application No. PCT/SE2010/050498, with an international filing date of May 5, 2010. Applicant claims priority based on Swedish Patent Application No. SE 0950317-8 filed May 6, 2009. The subject matter of these applications is incorporated herein in their entirety.

FIELD OF THE INVENTION

The present invention relates to a module for assembly of a filter frame for at least one filter disc of a rotatable disc filter, which filter frame is provided for supporting at least two filter segments, which filter segments together form the outer part of said filter disc, which module comprises an intermediate member intended to be at least partially provided between two adjacent filter segments.

BACKGROUND OF THE INVENTION

A disc filter is for example used for filtration of water in purification plants. A common design of a disc filter comprises a rotating drum which is intended for receiving fluid which is to be filtered, and at least one disc shaped filter means which is provided outside the drum and which extends outwardly in the lateral direction of the drum. Fluid flows out through orifices in the drum and further through the filter means. Any particles in the fluid adhere to the filter means as the fluid passes through the filter means, and are hence separated from the fluid which passes freely through the filter means.

Known filter means comprise a filter frame and at least one filter section supported thereof. A filter section can be made in one piece, but this is often unpractical since the entire filter section has to be replaced if there is any damage, even if the damage is limited to a smaller area. Therefore, in order to facilitate maintenance and repair of damages, the filter section is usually divided into several separate filter segments, which together form one filter section and which are detachably attached to the filter frame. That way there is no need for replacing the entire filter section if any damage occurs, but only the filter segment which has been damaged, thus decreasing both costs and the amount of time needed for maintenance and repair.

The above described disc filter with detachably attached filter segments do in many cases work satisfactorily. But it appears that the filter frame becomes large and bulky as regards disc filters dimensioned for large flows. SE 526,692 describes a disc filter which partly amends this disadvantage since the filter frame is assembled by several modules which can be interconnected around the drum. The modules consist of a continuous intermediate member from which two outer members extend outwardly at one end, and two inner members extend outwardly at the other end. The inner members are intended for being attached at the drum and the intermediate member extends from the drum in radial direction. When two such modules are interconnected around a drum, they will together form a frame in which a filter segment can be attached. With this solution, where the filter frame consists of modules, the filter frame can be transported in disassembled form to the location, where the disc filter is to be used, and then assembled on location. Thus the disc filter device requires less space during transportation.

Even though the module system above exhibits many desirable qualities, there is still room for improvement. When the disc filter is dimensioned for very large flows the disc filter device according to the above, despite of the modular assembly, will be bulky during transportation and the transportation space has an upper limit as regards how large the delivered disc filters can be.

SUMMARY OF THE INVENTION

It is an object of the present invention to eliminate, or at least reduce, the above problems, and to provide a module for assembly of a filter frame for a disc filter, which module is less bulky during transportation than previously known disc filter devices.

According to a first aspect of the present invention, these objects are achieved by providing a module for assembly of a filter frame for at least one filter disc of a rotatable disc filter, which filter frame is provided for supporting at least two filter segments, which filter segments together form the outer part of said filter disc, and which module comprises an intermediate member intended to be at least partially provided between two adjacent filter segments, characterised by the intermediate member comprising at least two parts which are interconnectable with each other in the radial direction of the disc filter.

With this arrangement, the intermediate member of the module is not continuous, but is provided in at least two parts which can be interconnected. Hence, the size of the module, before being interconnected, can be reduced compared to the intermediate member being continuous. Subsequently, the module will be less bulky, and easier to transport compared to known modules. For example, if the intermediate member consists of two equally long parts, the length of the module in the radial direction of the disc filter can become half of the length which the module would have had if the intermediate member would have been made in one piece.

According to one embodiment, the intermediate member extends in the radial direction of the disc filter. Such a design makes the resulting filter frame particularly stable and well supportive of any forces loaded on the disc filter.

In some situations, it is suitable if the at least two parts of the intermediate member are not only interconnectable, but also detachable from each other. Such a situation could occur if a part of the intermediate member of a module breaks and one wishes to replace it, or if one wishes to disassemble and move the disc filter. In order to facilitate this, in one embodiment of the invention, the at least two parts of the intermediate member are detachably interconnectable.

Preferably, the at least two parts of the intermediate member comprise means for connection of these parts. These connection means facilitate simple interconnection of the parts of the intermediate member with each other when assembling the filter frame. The connection means can be provided for interconnection of the different parts of the intermediate member, in a number of ways. In one preferred embodiment, each of the at least at least two parts of the intermediate member comprises at least one connection surface, wherein each connection surface is intended for interconnection with a corresponding connection surface of another of the parts of the intermediate member, wherein said means for connection are provided at said connection surfaces. "Connection surfaces" relates to the surfaces of parts of the intermediate member which abut each other when the intermediate member is interconnected.

However, note that it is not necessary for the connection means to be provided on the connection surface, but it is sufficient that they are provided at, i.e. close to, the connection surface. For example, a connection means can be provided such that it, on one hand, is attached to a first part of the intermediate member, some distance from a first connection surface, and on the other hand, to a second part of the intermediate member, some distance from a second connection surface, and that these both parts are interconnected in this way.

In one embodiment said means for connection comprises at least one protrusion on one of the connection surfaces, which protrusion is intended for engagement with at least one corresponding cavity in the corresponding connection surface. With this type of connection means, the assembly of the filter frame, and the assembly of the intermediate member in particular, becomes very simple and flexible. Since the protrusions and the cavities typically are formed on the parts of the intermediate member already during manufacture, no separate connection means are needed during assembly. Hence, the time and the level of difficulty, which is required for interconnection, are minimised.

In order to further improve the interconnection, the most protruding part of the protrusion can be designed for hooking into hooking means, which are provided below said cavity. In this way, securing of the protrusions into the cavities is accomplished.

Further, said hooking means can be resilient. In that way, the hooking of the outermost part of the protrusion is simplified and the securing is made stronger. Making the hooking means resilient can also simplify the detachment of two already interconnected intermediate members.

In one embodiment, the connection surfaces of the intermediate member are essentially rectangular. In this case, in order to avoid wobbling or twisting between the parts of the intermediate member after interconnection, it is suitable to provide the means for connection such that not all connection means are situated along a line which is parallel with any of the surfaces of the connection surface. One way of accomplishing this is to provide the protrusions along a diagonal of one of the connection surfaces, and to, in the same way, provide the corresponding cavities along a corresponding diagonal of a corresponding connection surface.

In alternate embodiments, other types of means for connection can be used. For example, at least one bolt can be provided through the connection surfaces in order to join these. Another example of means for connection is at least one clamp which is provided at one of the connection surfaces and attaching this to the corresponding connection surface. Alternatively, the connection means can comprise an adhesive which is applied to the connection surfaces for binding the surfaces to each other.

The features which have been described above, with reference to different alternate embodiments, can either appear individually or in combination with each other.

BRIEF DESCRIPTION OF THE DRAWINGS

The invention will be described in more detail below, with reference to the appended drawings showing a currently preferred embodiment of the invention, as an example.

DESCRIPTION OF PREFERRED EMBODIMENTS

Figure 1:
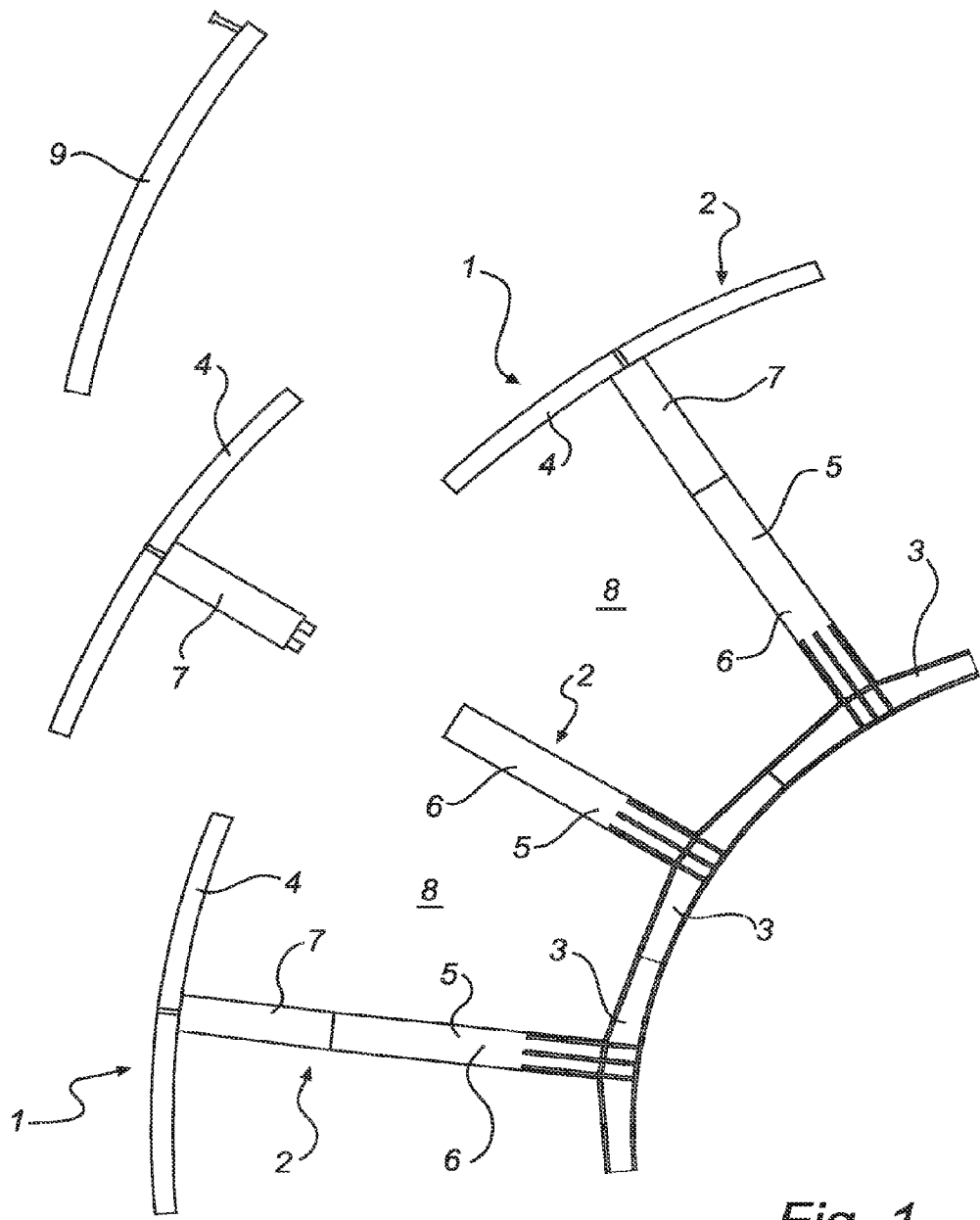
FIG. 1 shows a schematic side view of a number of modules according to an embodiment of the present invention.

The present invention refers to a module for assembly of a filter frame for at least one filter disc (not shown) of a rotatable disc filter. One example of one part of such a filter frame is shown in FIG. 1. The shown filter frame 1 consists of three partially assembled modules 2 which are designed according to an embodiment of the present invention. Each of the modules 2 consists of an inner member 3, an outer member 4, and an intermediate member 5. The inner member 3 of the module is intended for abutting, and assembly with, a drum (not shown). When several modules 2 are assembled together, through the joining of their inner members 3, the inner members 3 will together define a circle which radius coincides with the radius of the drum. From the inner member 3 of the module, an intermediate member 5 extends outwards in the lateral direction of the drum. The intermediate member 5 consists of at least two parts which are interconnectable with each other in the radial direction of the disc filter. In the embodiment shown in FIG. 1, the intermediate member consists of two parts, a first part 6 which is connected to the inner member 3 and a second part 7 which is connected to the outer member 4. The number of parts can be varied though, and by choosing more parts the size of the module, in a disassembled form, will become smaller and the module hence less bulky during transportation.

The design of the intermediate member can be varied. In the shown example, the angle between the inner member and the intermediate member is orthogonal, i.e. the intermediate member extends straight outwards in a radial direction. In other embodiments however, the angle between the inner member and the intermediate member can assume other values. Further, the intermediate member does not need to have a straight shape; the intermediate member can for example have a curved shape.

The outer member 4 of the module is connected to the part of the intermediate member 5 which is intended to be fitted the farthest from the drum, in this case the second part 7. The outer member 4 preferably has the shape of a circular arc such that it, together with the outer members of the other modules which form the filter frame, form a circle which is concentric with the periphery of the drum.

The modules 2 of the described example are manufactured through injection moulding of ABS plastic. Other plastic materials can also be used, and the appropriate manufacturing method is then chosen with respect to the type of plastic. The advantage of using plastic is that it is a relatively cheap and malleable material. It is also corrosion resistant.

Figure 4:
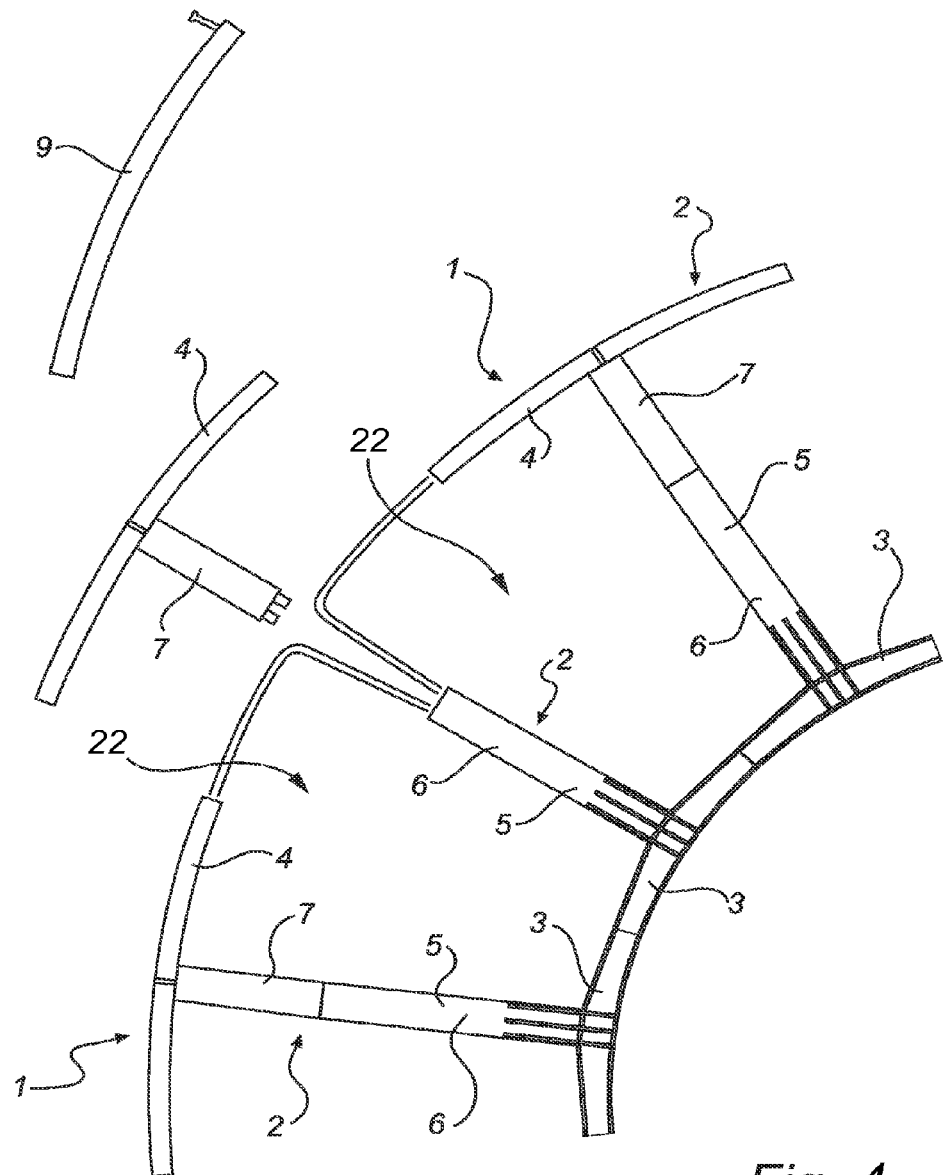
FIG. 4 is a view similar to FIG. 1 but shows filter segments incorporated.

When several modules 2 are connected, their inner members, intermediate members, and outer members will define a cell 8 in which filter segments 22 (FIG. 4) can be provided on either side of the filter frame 1. Hence, the inner members 3 will be provided between the drum and the filter segments, the outer members 4 between the filter segments and the outer periphery of the disc filter, and the intermediate members 5 at least partially between two adjacent filter segments 22. As is clear from the figures, the filter segments 22 are intended to be provided essentially edge to edge with each other, wherein an intermediate member 5 overlaps and supports two adjacent filter segments 22. In the shown embodiment, the intermediate members 5 are also provided between two filter segments 22 which are located at either side of a filter disc. The filter segments 22, which preferably are formed by frames onto which filter cloth is fitted, can be easily disposed in the cells 8 as the intermediate members have special grooves into which the filter segments can be pushed and secured. Together, the filter segments 22 form the outer part of the essentially circular filter disc, while the inner part forms a hole for the drum. In known manner, the filter segments are provided on both sides of the filter disc and several filter discs are provided along the drum of the disc filter.

When the modules 2 have been connected to a filter frame and the filter segments have been pushed into place in the cells 8, several covers 9 can be slipped onto and secured by screws at the outer periphery of the filter frame, i.e. at the outer members 4 of the modules 2. Each cover 9 is, in this respect, slipped onto the outer members 4 of two adjacent modules 2, and secured using screws. The covers 9 have the function of both keeping the outer members 4 of the modules 2 together in order to make the filter frame 1 stable, and of keeping the filter segments in place such that they remain in the cells 8.

Below, the parts of the intermediate member are described in more detail with reference to FIGS. 2a and 2b, and FIGS. 3a and 3b, respectively.

Figure 2A:
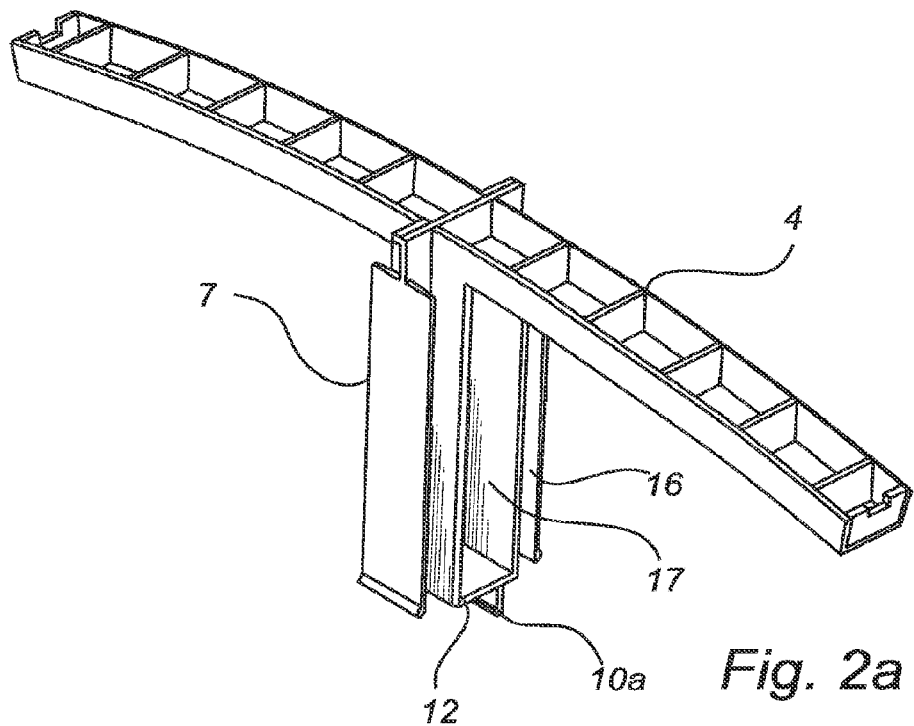
FIGS. 2a and 2b show a perspective view of a first and a second part, respectively, of a module according to an embodiment of the present invention.
Figure 2B:
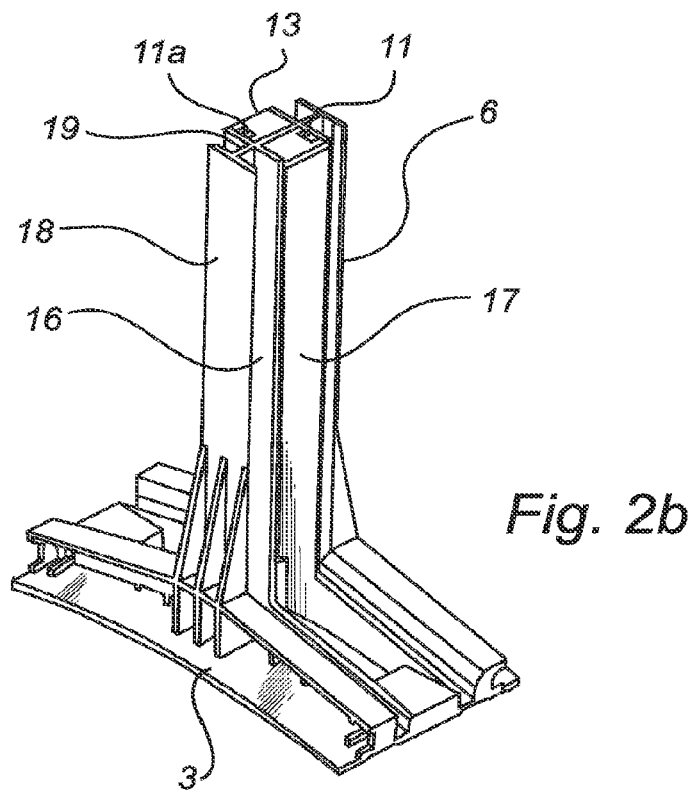
Figure 3A:
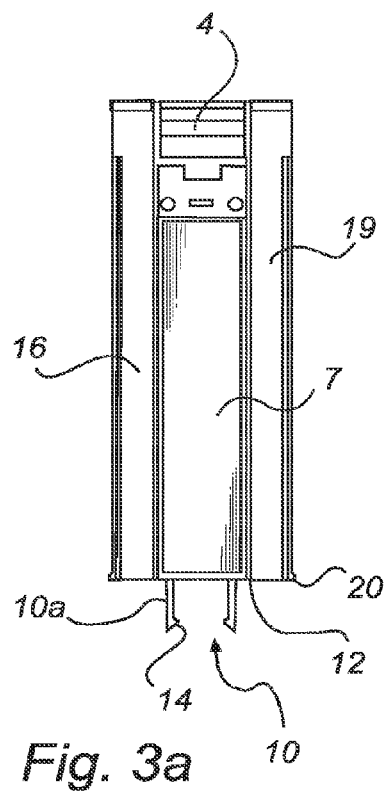
FIGS. 3a and 3b show a side view of a first and a second part, respectively, of a module according to an embodiment of the invention.
Figure 3B:
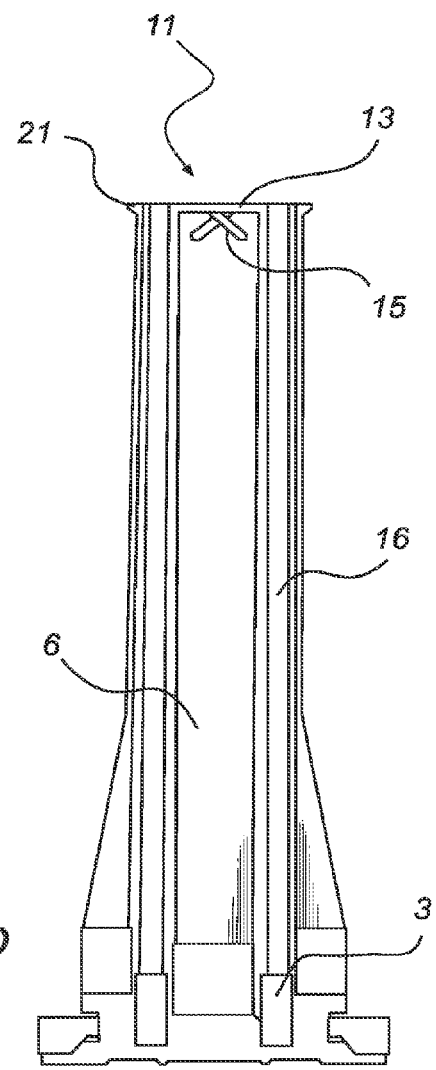

FIGS. 2a and 2b show a first upper and a second lower part, respectively, of a module 2 according to a preferred embodiment of the invention. FIGS. 3a and 3b show a side view of the corresponding parts. The upper part comprises a second part 7 of the intermediate member of the module and the outer member 4 of the module. The lower part comprises a first part 6 of the intermediate member and the inner member 3 of the module. Preferably, the upper and lower parts comprise means 10 and 11 for connection. In this case, the connection means 10 and 11 are provided on the connection surfaces 12 and 13, respectively, of the upper and lower part. The connection surfaces 12 and 13 are those end surfaces of the parts of the intermediate member which abut when the parts are connected. Since the parts of the intermediate member are intended for connection with each other, each connection surface has a corresponding connection surface on another of the parts of the intermediate member. In the shown example, the connection surfaces 12 and 13 correspond to each other. If the intermediate member consists of more than two parts, some parts will have two connection surfaces, which correspond to connection surfaces located on two different parts of the intermediate member.

In the shown example, the connection surfaces have a normal direction which points in the radial direction of the disc filter, which facilitates connection of the parts of the intermediate member in radial direction. However, other designs of the connection surfaces are possible. For example, they can be designed as surfaces having a normal direction at a 45° angle from the radial direction of the disc filter.

The connection means 10 and 11 can basically be formed by any means serving the purpose of connecting the parts of the intermediate member. However, they preferably comprise at least one protrusion 10a on one of the connection surfaces, in this case the connection surface 12, and a corresponding cavity 11a on another corresponding connection surface, in this case connection surface 13. In the shown example, the connection means 10 and 11 comprise two protrusions 10a and two corresponding cavities 11a. Preferably, the design of the protrusions 10a is such that it engages with the corresponding cavity 11a. Better still, the protrusions are designed such that, when engaging with the cavities, they are secured with the same. This way, a connection which keeps the parts 6 and 7 of the intermediate member 5 securely together is provided. In the embodiment according to FIG. 2, the protrusions 10a are designed as pins which extend outwardly from the connection surface 12. These pins have a rectangular cross-section which matches the shape of the holes 11 which form corresponding cavities 11a on the connection surface 13.

In order to obtain a locking effect as the protrusion 10a is introduced into the cavity 11a, the most protruding part 14 of the protrusion can be designed for hooking into hooking means 15, which are provided below the cavity 11a. In the shown embodiment, the most protruding part 14 is designed as a small hook which extends along the edge of the part 14. This hook is designed in order to hook into hooking means 15 which are provided below the cavity 11a. These hooking means 15 are, in this case, provided on the bottom side of the connection surface 13, which is facilitated by the first part 6 of the intermediate member having a cavity below the connection surface 13. The hooking means are designed as protrusions which are provided on the bottom side of the connection surface 13 and which extend obliquely outwards from this. The position of the hooking means 15 on the bottom side of the connection surface 13, at which the hooking means 15 is attached and the angle which the protrusions of the hooking means 15 form with this surface, is preferably adapted such that the tips of the protrusions go straight underneath the cavities 11. Further, the distance between the connection surface 13 and the tips of the protrusions of the hooking means 15 is preferably adjusted such that this distance matches the length of the protrusions 10a which are inserted through the cavities 11a, which in this case comprise holes in the connection surface 13. In this way, the hook on the most protruding part 14 of the protrusion 10a will be able to fit into and hook into the hooking means 15, as the protrusion 10a is inserted into the cavity 11a. This facilitates that the parts of the intermediate member 5 can be easily connected and remain secured by each other.

In order to further facilitate the hooking of the protrusions 10a into the hooking means 15, the hooking means can be made resilient. This is for example accomplished by the hooking means being made in a material which is not completely rigid but which can spring when being subjected to a force, which for example is met by some kinds of plastics. If the hooking means 15 are resilient, these can be pushed away by the most protruding part 14 of the protrusion 10a, which protruding part 14 is shown in FIG. 3a as a hook, when the protruding part 14 is inserted through the cavity 11a and past the hooking means 15. When the most protruding part 14 has passed the tip of the hooking means 15, this can spring back and hence secure the protrusion 10a.

In some situations, for example when one wants to be able to disassemble the filter frame 1 of a disc filter, it is advantageous if the different parts of the intermediate member 5 are detachably connected. This is preferably accomplished by using elastic hooking means 15 as shown above. In order to detach the parts of the intermediate member 5, a force can be applied on the hooking means 15 and with that forcing them to spring back. Hence, the hooking of the hooking means 15 onto the most protruding part 14 of the protrusions 10a will be released, and the parts 6 and 7 of the intermediate member 5 can be detached from each other.

The location of the connection means 10 and 11 on the connection surfaces 12 and 13 can be varied and adjusted according to the shape of the parts of the intermediate member 5 and the forces which are expected to act upon the filter frame 1 during use. For example, the connection means 10 and 11 can be offset in relation to each other. In the shown embodiment, the intermediate members have an essentially rectangular cross-section, and therefore an inappropriate location of the connection means 10 and 11 could lead to the parts 6 and 7 of the intermediate member 5 wobbling or twisting in relation to each other and hence causing instability in the filter frame 1. In order to avoid this, the connection means 10 and 11 can be provided along the diagonals of the connection surfaces 12 and 13, as shown in FIG. 2. Hence, an increased stability can be accomplished.

Letting the connection means 10 and 11 comprise protrusions 10a and cavities 11a is a simple way of facilitating interconnection between the parts of the intermediate member. The protrusions 10a and the cavities 11a can be formed at the same time as the rest of the module 2, and therefore the assembly and mounting of the module and the filter frame 1 will be particularly simple as there is no need for dealing with any loose connection means. However, there are many good options for protrusions 10a and cavities 11a. For example, a screw or a bolt can be used for interconnection of the parts of the intermediate member. These are preferably provided through the connection surfaces 12 and 13 in order to join them. In a similar way, clamps or clasps can be used for securing the connection surfaces 12 and 13 to each other. Alternatively, bolts, screws, clamps, and clasps can be used in order to connect the parts of the intermediate member 5, without being provided on a connection surface. For example, a clamp can connect two parts of the intermediate member 5 by being provided on one hand on a first part of the intermediate member 5, but not on a connection surface, and on another hand on a second part of the intermediate member 5, which is not a connection surface either. A further alternative is to use adhesive, such as glue, for interconnecting the parts of the intermediate member. This is preferably applied on the connection surfaces of the intermediate member in order to join these together. It is also possible to combine different kinds of connection means in order to accomplish a better connection.

In order to receive and support filter segments, the intermediate member of the module can further be provided with special grooves 16. These grooves can be accomplished by the intermediate member 5 comprising an inner part 17 and at least one front part 18, which are connected by at least one partition 19, perpendicular to the inner part 17 and the front part 18. Since the partition 19 separates the inner part 17 and the front part 18, a space which defines grooves 16 in the intermediate member is formed. When the parts of the intermediate member are connected, it is important that these are designed such that the grooves 16 are neither blocked nor obstructed. In order to be sure that there will be no problems in the joints between the parts of the intermediate member, extra connection means 20 and 21 can be provided on those surfaces of the front parts 18 which abut each other when the parts 6 and 7 of the intermediate member 5 are connected. These extra connection means 20 and 21 can for example comprise protrusions and cavities.

It is realised that there are a number of modifications of the above described embodiment of the invention, which are feasible within the scope of the invention such as defined by the following claims. For example, the connection means can be executed in a number of ways, and when they comprise protrusions and cavities, the design of these can vary. For example, one can use cylindrical protrusions and the cavities do not necessarily need to be holes which pass through a connection surface, but can just as well be designed as a pit. In the latter case, the hooking means can be provided in the pit instead of being protrusions which are separate from the cavity. Further, the number of means for connection and the number of parts of the intermediate member can be varied as well as their design.

The invention claimed is:

1. A filter frame module for forming a filter frame assembly of a rotatable filter disc, the module comprising:
    an inner member configured to abut a filter drum, outer member configured to be spaced away from the filter drum, and first and second intermediate members;
    the first intermediate member configured to be coupled to the inner member such that it extends in a lateral direction from the drum toward the outer member;
    the second intermediate member configured to be coupled to the outer member such that it extends in the lateral direction from the outer member toward the inner member;
    wherein the filter frame module is configured to form a part of the filter frame assembly of the rotatable filter disc; and
    wherein the filter frame assembly supports at least two filter segments and wherein the two filter segments together form an outer part of said filter disc and wherein the intermediate members are disposed between two adjacent filter segments.

2. The filter frame module of claim 1, wherein the intermediate members are configured to extend in the radial direction of the filter disc.

3. The filter frame module of claim 2, wherein the first and second intermediate members are detachably interconnectable.

4. The filter frame module of claim 3, wherein one of the first and second intermediate members includes a protrusion and the other of the first and second intermediate members includes a cavity configured to receive the protrusion.

5. The filter frame module of claim 4, wherein the first and second intermediate members each include a connection surface configured to abut another and wherein the protrusion extends from one of the connection surfaces and the cavity defines a recess in the other connection surface.

6. The filter frame module of claim 5, wherein said connection surfaces are essentially rectangular, and wherein said protrusion is provided along a diagonal of one of said connection surfaces, and said cavity is provided along a corresponding diagonal of the other said connection surface.

7. The filter frame module of claim 4, wherein the protrusion is hook-shaped and is configured to be secured into a hook receiving area within the cavity.

8. The filter frame module of claim 7 wherein the hook receiving area within the cavity includes a resilient catch for engaging the protrusion.

9. The filter frame module of claim 3, wherein the first and second intermediate members each include connection surfaces and the first and second intermediate members are configured to be joined together with a clamp which is spaced away from both of the connection surfaces.

10. The filter frame module of claim 3, wherein the first and second intermediate members are configured to be joined with a bolt extending through connection surfaces on each of the first and second intermediate members.

11. The filter frame module of claim 1 wherein the first intermediate member is configured to be detachably connected to the second intermediate member.

12. The filter frame module of claim 1 further comprising a third intermediate member configured to be disposed between the first intermediate member and the second intermediate member.

13. The filter frame module of claim 1 wherein the inner member is a first inner member and the outer member is a first outer member and wherein the module further comprises:

a second inner member, a second outer member and third and fourth intermediate members;

wherein the first and second inner members, the first and second outer members, and the first, second, third, and fourth intermediate members form a cell configured to receive one of the filter segments.

14. The filter frame module of claim 1 wherein the first intermediate member and the second intermediate member each include grooves configured to receive the filter segments.

15. The filter frame module of claim 14 wherein the first and second intermediate members each include a central post, an outer flange, and a partition extending between the central post and the outer flange, wherein the grooves are formed on either side of the partition.

16. A filter frame assembly for a rotatable filter disc, comprising:
    a. a modular filter frame that forms a part of the rotatable filter disc;
    b. the modular filter frame comprising a series of interconnected filter frame modules;
    c. each filter frame module including:
        i. an inner member configured to abut a drum;
        ii. an outer member spaced outwardly from the drum;
        iii. an intermediate member connected between the inner and outer members;
        iv. the intermediate member including first and second intermediate members that are detachably interconnected;
    d. wherein the series of filter frame modules are connected together to form at least a part of the rotating filter disc;
    e. wherein the inner members of the filter frame modules are connected together in end-to-end relationship and form a continuous curved structure that is configured to extend around the drum; and
    f. wherein the filter frame assembly comprises at least two filter segments and wherein the two filter segments together form an outer part of the filter disc and wherein the intermediate member is disposed between two adjacent filter segments.

17. The filter frame assembly of claim 16 wherein the first intermediate member is integral with the inner member of the filter frame module and wherein the second intermediate member is integral with the outer member of the filter frame module, and wherein the filter frame module is constructed of plastic.

18. The filter frame assembly of claim 16 further including a connecting structure for detachably interconnecting the first and second intermediate members together.

19. The filter frame assembly of claim 18 wherein the connecting structure includes at least one protrusion extending from the first or second intermediate member and configured to be received within a receiving area within the other intermediate member and wherein the protrusion is operative to securely connect the first and second intermediate members together.

20. The filter frame assembly of claim 19 wherein the protrusion includes a hook for engaging a catch in the other intermediate member.

* * * * *